United States Patent
Tanaka (10) Patent No.: US 10,372,215 B2
(45) Date of Patent: Aug. 6, 2019

(54) INPUT APPARATUS AND CONTROL METHOD OF INPUT APPARATUS

(71) Applicant: FUJITSU TEN LIMITED, Kobe-shi, Hyogo (JP)

(72) Inventor: Takashi Tanaka, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 15/369,260

(22) Filed: Dec. 5, 2016

(65) Prior Publication Data

US 2017/0205882 A1    Jul. 20, 2017

(30) Foreign Application Priority Data

Jan. 14, 2016  (JP) .................................. 2016-005381

(51) Int. Cl.
  *G06F 3/01*  (2006.01)
  *G06F 3/0488*  (2013.01)
  *G06F 3/041*  (2006.01)

(52) U.S. Cl.
  CPC ............ *G06F 3/016* (2013.01); *G06F 3/0416* (2013.01); *G06F 3/0488* (2013.01)

(58) Field of Classification Search
  CPC .................................. G06F 3/016; G06F 3/041
  See application file for complete search history.

(56) References Cited

U.S. PATENT DOCUMENTS

2011/0291976 A1* 12/2011 Takada ................... G06F 3/016
                                                                    345/173
2013/0314355 A1* 11/2013 Inata ..................... G06F 1/1626
                                                                    345/173

FOREIGN PATENT DOCUMENTS

JP   2013-235614 A   11/2013
JP   2015-230540 A   12/2015

* cited by examiner

*Primary Examiner* — Sepehr Azari
(74) *Attorney, Agent, or Firm* — Oliff PLC (57) ABSTRACT

An input apparatus according to the present embodiment includes a detector, a vibration element, and an element controller. The detector detects a touch on an operation surface. The vibration element vibrates the operation surface. The element controller reduces or stops a vibration of the vibration element based on a continuation time of the touch that is detected by the detector in a state where the operation surface is being vibrated.

7 Claims, 6 Drawing Sheets

| COORDINATE | STANDING WAVE |
|---|---|
| X1 | ANTINODE |
| X2 | NODE |
| X3 | ANTINODE |
| X4 | NODE |
| ⋮ | ⋮ |

INPUT APPARATUS AND CONTROL METHOD OF INPUT APPARATUS

CROSS-REFERENCE TO RELATED APPLICATION

This application is based upon and claims the benefit of priority of the prior Japanese Patent Application No. 2016-005381, filed on Jan. 14, 2016, the entire contents of which are incorporated herein by reference.

FIELD

The embodiment discussed herein is directed to an input apparatus and a control method of the input apparatus.

BACKGROUND

Conventionally, there is known an input apparatus that gives a sense of touch to a user to inform the user that the input of the user is accepted. The input apparatus generates vibration, for example, in accordance with pressure force by a user to inform the user that the input of the user is accepted (for example, Japanese Laid-open Patent Publication No. 2013-235614).

However, the conventional input apparatus has a possibility that the vibration of the input apparatus is converted to heat between a user and an operation surface so as to increase the temperature of the operation surface in such a case that the user continues to touch the vibrating operation surface for a long time.

SUMMARY

An input apparatus according to an embodiment includes a detector, a vibration element, and an element controller. The detector detects a touch on an operation surface. The vibration element vibrates the operation surface. The element controller reduces or stops a vibration of the vibration element based on a continuation time of the touch that is detected by the detector in a state where the operation surface is being vibrated.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, an exemplary embodiment of an input apparatus and a control method of the input apparatus disclosed in the present application will be explained in detail with reference to the accompanying drawings. It is not intended that this invention be limited to the embodiment described below.

Figure 1A:
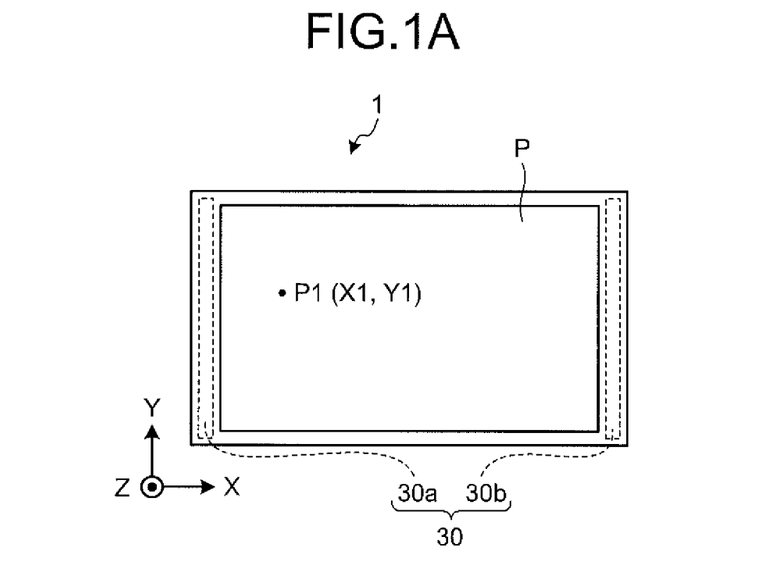
FIG. 1A is a diagram illustrating the outline of an input apparatus according to an embodiment.

First, the summaries of an input apparatus according to the present embodiment will be explained with reference to FIG. 1A. FIG. 1A is a diagram illustrating the outline of an input apparatus 1 according to the present embodiment.

The input apparatus 1 is a device having functions of a input device such as a touch pad or a smartphone. As illustrated in FIG. 1A, the input apparatus 1 includes an operation surface P and vibration elements 30(30a, 30b). The operation surface P is constituted of, for example, an electrostatic-capacitance panel having information inputting functions, and when the user touches an operation surface P with a finger or a pointing device such as a stylus pen, the input apparatus 1 detects a touch of the user on the operation surface P.

a vibration element 30 is, for example, a piezoelectric element to vibrate the operation surface P at a high frequency. For example, when the vibration element 30 is vibrated in such a state that the user presses down the operation surface P with a finger, an air layer is formed between the finger and the operation surface P by the vibration, and the frictional force between the finger and the operation surface P varies. If the finger is moved in such a state, the sense of touch corresponding to the varied frictional force can be given to the finger.

In this way, the input apparatus 1 according to the present embodiment causes the operation surface P to vibrate by using the vibration element 30, and thus can give the sense of touch to the user.

By the way, if the finger of the user touches the vibrating operation surface P, the vibration of the operation surface P is converted to heat at the position (hereinafter, may be referred to as "touch position") where the finger of the user touches the operation surface P. The heat is accumulated in accordance with a continuation time in which the finger of the user continuously touches the operation surface P in a vibrating state. If the continuation time becomes long, the temperature of the touch position increases by the accumulated heat, thereby leading to increase in the temperature of the operation surface P.

Therefore, with regard to the input apparatus 1 according to the present embodiment, the operation surface P is controlled to be at appropriate temperature by reducing or stopping the vibration of the vibration element 30 on the basis of the continuation time. Hereinafter the outline of a control method of the input apparatus 1 according to the present embodiment will be explained with reference to FIG. 1B.

Figure 1B:
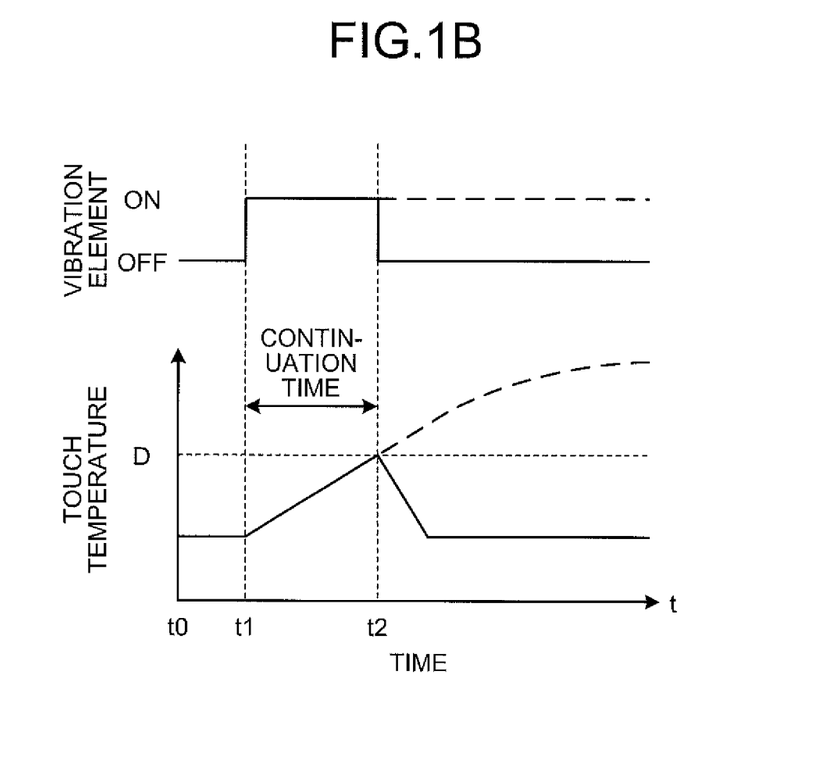
FIG. 1B is a diagram illustrating the outline of a control method of the input apparatus according to the embodiment.

FIG. 1B is a diagram illustrating the outline of a control method of the input apparatus 1 according to the present embodiment. The ON/OFF state of the vibration element 30 is illustrated in the upper part of FIG. 1B. The horizontal axis indicates the time, and the user is assumed to touch constantly a touch position P1 (X1, Y1) of the operation surface P from the time t0 (see FIG. 1A). "Touch temperature" illustrated in the lower part of FIG. 1B indicates the temperature of the touch position P1. The touch temperature D illustrated in the drawing is, for example, 40 degrees.

The vibration element 30 is OFF during the time t0 to t1 illustrated in FIG. 1B. In this state, because the operation surface P does not vibrate, the touch temperature of the touch position P1 does not increase. Subsequently, when an ON-requesting signal of the vibration element 30 is input from, for example, a higher layer (not illustrated) at the time t1, the vibration element 30 is turned from OFF to ON. When the vibration element 30 is ON, the operation surface P is also vibrated, and the touch temperature gradually increases. The input apparatus 1 starts to measure a continuation time at the time t1, in other words, the timing when the vibration element 30 is turned ON. The continuation time is here the continuation time of the touch on the operation surface P, which is detected by the input apparatus 1 in such a state that the operation surface P is vibrated.

Next, the touch temperature of the touch position P1 reaches the touch temperature D at the time t2. The input apparatus 1 here reduces or stops the vibration of the vibration element 30 on the basis of the measured continuation time. In an example illustrated in FIG. 1B, the input apparatus 1 turns the vibration element 30 from ON to OFF, in other words, stops the vibration element 30. For example, a threshold time is set for the continuation time, and the input apparatus 1 turns from ON to OFF the vibration element 30 when the continuation time exceeds the threshold time.

When the vibration element 30 is turned OFF, because the operation surface P does not vibrate, the touch temperature declines to the temperature similar to that before the time t1 after a predetermined time elapses. Therefore, the input apparatus 1 can control the operation surface to the appropriate temperature. Moreover, the input apparatus 1 may reduce the vibration of the vibration element 30 at the time t2. On the other hand, for example, when the input apparatus 1 does not control the vibration element 30 to OFF at the time t2, as illustrated by a dashed line in FIG. 1B, the touch temperature of the touch position P1 increases to exceed the touch temperature D.

A rising rate of the touch temperature to the continuation time can be derived by calculation, an experiment, etc. Therefore, the time for the touch temperature to reach the touch temperature D can be previously derived from the continuation time and the rising rate. The derived time is to be stored as the threshold time, and when the measured continuation time becomes the threshold time or more, the input apparatus 1 reduces or stops the vibration of the vibration element 30.

In this way, the input apparatus 1 according to the present embodiment reduces or stops the vibration of the vibration element 30 on the basis of the continuation time. Therefore, the touch temperature between the user and the operation surface P does not exceed the touch temperature D, and thus the operation surface P can be controlled to the appropriate temperature.

Moreover, because the input apparatus 1 measures the continuation time and controls the vibration element 30 to OFF on the basis of the measured continuation time and the previously stored threshold time, a complicated process, a temperature sensor that measures the touch temperature of the touch position P1, and the like are not necessary. Therefore, the input apparatus 1 can be miniaturized, and also the manufacturing cost thereof can be reduced. Hereinafter, details of the input apparatus 1 will be explained.

Figure 2:
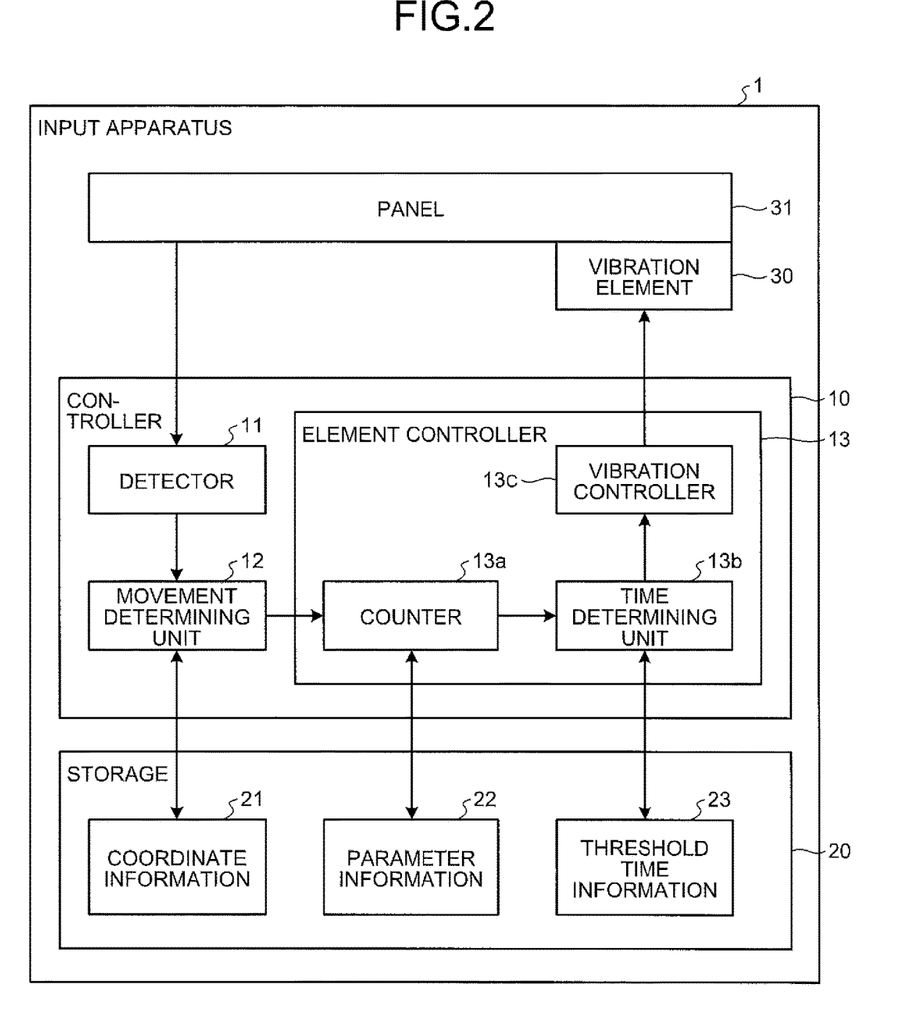
FIG. 2 is a block diagram illustrating a configuration example of the input apparatus according to the embodiment.

First, a configuration of the input apparatus 1 according to the present embodiment will be explained with reference to FIG. 2. FIG. 2 is a block diagram illustrating a configuration example of the input apparatus 1 according to the present embodiment. As illustrated in FIG. 2, the input apparatus 1 includes a controller 10, a storage 20, vibration elements 30, and a panel 31.

The panel 31 of the input apparatus 1 includes, for example, a planar sensor such as a touch pad, and further includes the operation surface P that accepts an input operation by a touch operation of the user. When the user touches the operation surface P, the panel 31 outputs to the controller 10 a sensor value according to the touch position of the user.

The vibration element 30 is a piezoelectric actuator such as a piezoelectric element to cause the panel 31 to vibrate by expanding and contracting in accordance with drive voltage that is input from the controller 10. The vibration element 30 is, for example, an element that vibrates the operation surface P in an ultrasonic range. The vibration element 30 is arranged so as to touch the panel 31. The number of the vibration element 30 may be one, two, or more. The case in which a piezoelectric element is employed as the vibration element 30 is here explained, however not limited thereto, it is sufficient that the vibration element 30 is an element that vibrates, for example, the operation surface P in an ultrasonic-frequency range.

The controller 10 controls the vibration of the vibration element 30 to control the operation surface P to the appropriate temperature. The controller 10 includes a microcomputer, which includes a Central Processing Unit (CPU), a Read Only Memory (RAM) and a Random Access Memory (RAM), an input/output port, etc., various circuits, and the like. The CPU of the microcomputer loads to perform a program stored in the ROM, and thus realizes controls to be mentioned later. The controller 10 includes a detector 11, a movement determining unit 12, and an element controller 13. For example, the CPU loads to perform the program, and thus functions of the detector 11, the movement determining unit 12, and the element controller 13 are realized.

Moreover, each of the detector 11, the movement determining unit 12, and the element controller 13 may be partly or wholly constituted of hardware such as an Application Specific Integrated Circuit (ASIC) or a Field Programmable Gate Array (FPGA).

The detector 11 detects a touch on the operation surface P. Specifically, the detector 11 detects a touch position on the operation surface P on the basis of a sensor value that is input from the panel 31 to generate information (hereinafter, may be referred to as "touch-position information") on the touch position. The detector 11 outputs to the movement determining unit 12 the generated touch-position information.

A signal that indicates an ON/OFF operation situation of the vibration element 30 is here assumed to be input to the detector 11 from the higher layer (not illustrated). When the signal indicates that the vibration element 30 is presently ON, the detector 11 is to output the touch-position information to the movement determining unit 12. Namely, when detecting a touch in a state that the operation surface P is vibrated, the detector 11 outputs the touch-position information to the movement determining unit 12. In other words, the detector 11 does not output the touch-position information in at least one of the case where the operation surface P is not vibrated, and the case where the detector 11 does not detect the touch. The detector 11 may acquire from the element controller 13 a signal that indicates an ON/OFF-operation situation of the vibration element 30. Moreover, the movement determining unit 12 to be mentioned later may acquire the signal, and further may determine moving/stopping of the touch when the vibration element 30 is ON.

For example, because the detector 11 detects the touch position of the user in a predetermined cycle, even when the user moves on the operation surface P and the touch position varies, the detector 11 can detect the touch position following the variation. Moreover, even when the user and the operation surface P are in contact with each other at two or more points simultaneously, the detector 11 can also detect each of the touch positions following the corresponding position.

The movement determining unit 12 determines whether the touch on the operation surface P is in a stopped state or a moving state. Specifically, the movement determining unit 12 determines whether the touch position is in the stopped state or the moving state on the basis of a plurality of the touch-position information, which continues in time, input from the detector 11 and coordinate information 21 previously stored in the storage 20. The movement determining unit 12 outputs the determination result to the element controller 13.

Figure 3A:
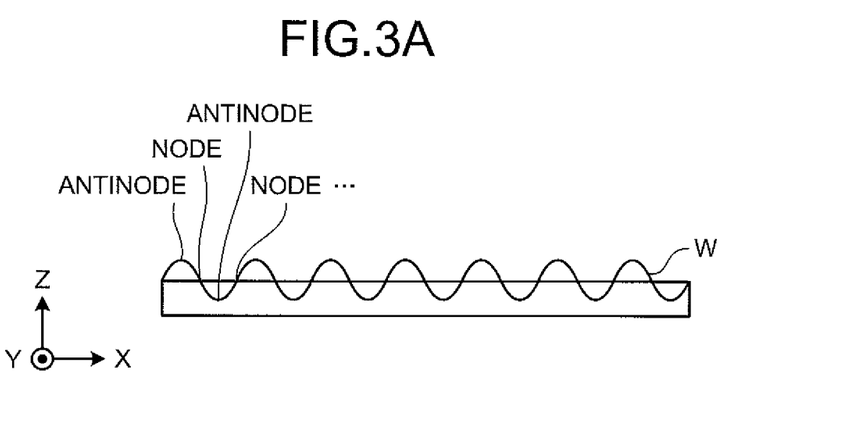
FIG. 3A is a schematic diagram illustrating a standing wave of a panel.
Figure 3B:
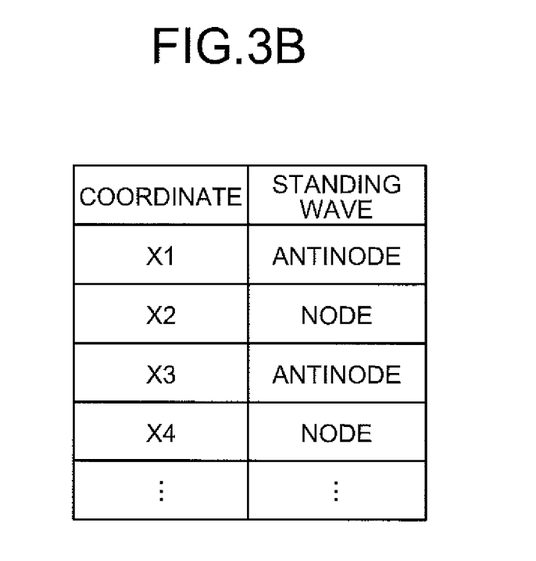
FIG. 3B is a diagram illustrating an example of coordinate information.

The coordinate information 21 will be here explained with reference to FIGS. 3A and 3B. FIG. 3A is a schematic diagram illustrating a standing wave W of the panel 31. FIG. 3B is a diagram illustrating an example of the coordinate information 21. As illustrated in FIG. 3A, the element controller 13 vibrates the vibration element 30 so that a predetermined standing wave W generates in the panel 31. The standing wave W is assumed to include antinodes and nodes that are repeated alternately along the X axis at a predetermined distance interval.

The operation surface P vibrates at parts of the panel 31, which correspond to the antinodes of the standing wave W, on the other hand, the operation surface P does not vibrate at parts of the panel 31, which correspond to the nodes. Therefore, vibration of the operation surface P is converted to heat between the user and the operation surface P at the antinodes of the standing wave W, on the other hand, vibration of the operation surface P is not converted to heat between the user and the operation surface P at the nodes of the standing wave W. In other words, efficiency, with which the vibration of the operation surface P is converted to heat between the user and the operation surface P, differs in the antinodes and the nodes of the standing wave W.

Because the interval between the antinode and the node of the standing wave W is narrower than the width of a finger of the user, if the user touches the operation surface P with the finger, the finger of the user is to touch both the antinode and the node of the standing wave W.

The coordinates of the antinode and the node of the standing wave W and the distance intervals between them become characteristic values that are defined by the frequency of the standing wave W. Therefore, the input apparatus 1 can previously store the characteristic values corresponding to the frequency of the standing wave W as the coordinate information 21.

Specifically, the coordinate information 21 is information in which a predetermined coordinate of the operation surface P and which of the antinode or the node of the standing wave W the predetermined coordinate corresponds to are associated with each other. In an example illustrated in FIG. 3B, a coordinate X1 is stored as the antinode of the standing wave W, and a coordinate X2 is stored as the node of the standing wave W in the coordinate information 21. Similarly, a coordinate X3 is stored as the antinode, and a coordinate X4 is stored as the node.

As described above, because the antinode and the node of the standing wave W are repeated alternately at a predetermined distance interval, each of the intervals between the coordinate X1, X2, X3, and X4 becomes the same. Therefore, the coordinate information 21 may include the coordinate that indicates the position of at least one of the antinode and the node at the frequency and the distance (distance between the two adjacent antinodes) of a half wavelength of the standing wave W.

The movement determining unit 12 derives a moving vector of the touch on the operation surface P from a plurality of the touch-position information, which continues in time, input from the detector 11. The movement determining unit 12 checks the derived vector from the coordinate information 21, and determines that the touch is in the stopped state when the derived vector is a half wavelength or less of the standing wave W along the X axis.

In other words, for example, when the derived vector is a half wavelength or less of the standing wave W along the X axis, the movement determining unit 12 determines that the touch is in the stopped state even when the derived vector is a half wavelength or more of the standing wave W along the Y axis. Moreover, the movement determining unit 12 outputs to the element controller 13 the determination result (hereinafter, may be referred to as "stopping-state signal") indicating that the touch is in the stopped state.

On the other hand, when the derived vector is a half wavelength or more of the standing wave W along the X axis, the movement determining unit 12 determines that the touch is in the moving state. The movement determining unit 12 outputs to the element controller 13 the determination result (hereinafter, may be referred to as "moving-state signal") indicating that the touch is in the moving state.

When the touches of two or more points are included in the touch-position information that is input from the detector 11 (in other words, when the user touches the operation surface P at two or more points), the movement determining unit 12 determines, for the touch of each of the two or more points, whether the touch is in the stopped state or the moving state. When determining that at least one of the touches of two or more points is in the stopped state, the movement determining unit 12 outputs to the element controller 13 the stopping-state signal regardless of other touches.

In this way, when the derived vector is a half wavelength or more of the standing wave W along the X axis, the movement determining unit 12 determines that the touch is in the moving state, and thus the element controller 13, which controls the vibration element 30 on the basis of the determination result, can appropriately control the temperature of the operation surface P.

The element controller 13 measures the continuation time, and reduces or stops the vibration of the vibration element 30 when the continuation time becomes the threshold time or more, which is based the determination result of the movement determining unit 12. The element controller 13 includes a counter 13a, a time determining unit 13b, and a vibration controller 13c.

The counter 13a sets a counter value, which is weighted in accordance with the determination result of the movement determining unit 12, to count the continuation time by the set counter value. The weighting is here an amplification factor of the counter value per unit time. The amplification factor of the counter value per unit time corresponds to the rising rate of the touch temperature to the continuation time.

Therefore, the counter value of the counter 13a corresponds to the touch temperature of the present touch position. The counter value counted by the counter 13a is input to the time determining unit 13b. The amplification factor of the counter value is previously derived by experiments or the like, and information on the derived amplification factor is stored in the storage 20 as parameter information 22.

When the stopping-state signal is input from the movement determining unit 12, the counter 13a invokes the amplification factor that falls under the stopped state from the parameter information 22 to set the invoked amplification factor.

Similarly, when the moving-state signal is input from the movement determining unit 12, the counter 13a invokes the amplification factor that falls under the moving state from the parameter information 22 to set the counter value to the amplification factor corresponding to the moving state.

The amplification factor of the counter value in the stopped state is set so that it is higher than that in the moving state. This is because the increase in the touch temperature is more rapid in the case of stopped state than in that of the moving state.

Specifically, as described above, because the vibration of the operation surface P is not converted to heat in the part of the touch position corresponding to the node of the standing wave W, the touch temperature does not increase. However, because the vibration of the operation surface P is converted to heat in the part corresponding to the antinode, the touch temperature increases. Moreover, the interval between the antinode and the node of the standing wave W is narrower than the width of a finger of the user.

Therefore, when the user touches the operation surface P with the finger, the finger of the user touches both the antinode and the node. If the touch is in the stopped state, the touch temperature regionally increases in the part, which is in contact with the finger of the user, corresponding to the antinode.

On the other hand, when the touch is in the moving state, the finger of the user moves alternately on the antinode where the touch temperature increases and the node where it does not increase. Therefore, because the increase in the touch temperature is averaged between the antinode and the node, the touch temperature increases more slowly in such a case that the touch is in the moving state than in the stopped state. Therefore, the amplification factor of the counter value in the stopped state is set to be higher than that in the moving state.

Figure 4A:
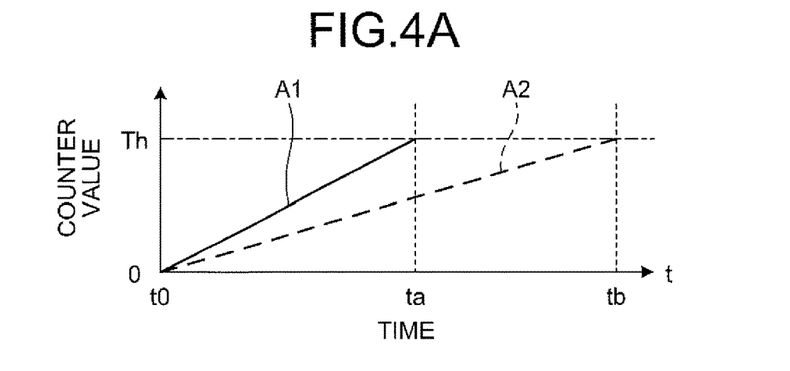
FIG. 4A is a diagram illustrating processing by a counter when a determination result of a movement determining unit is constant.
Figure 4B:
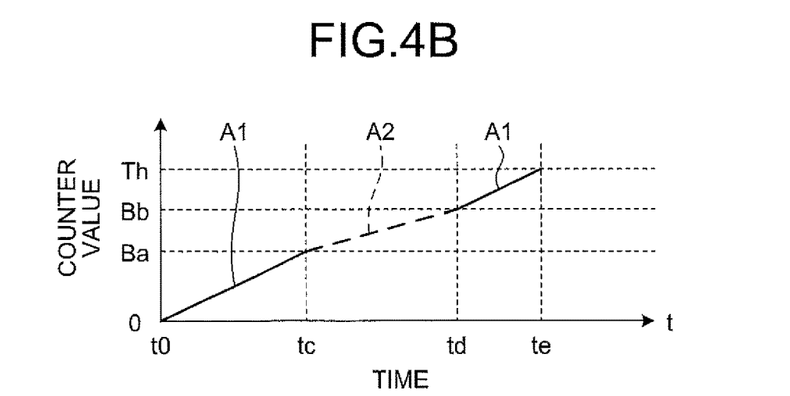
FIG. 4B is a diagram illustrating processing by the counter when a determination result of the movement determining unit varies.
Figure 4C:
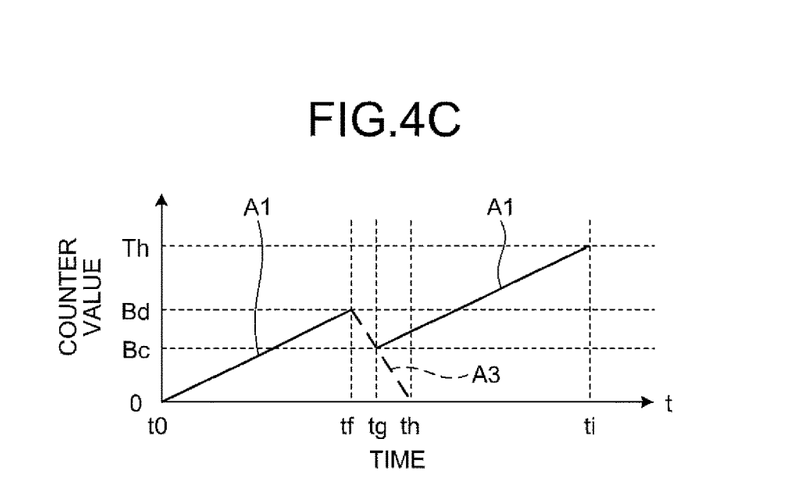
FIG. 4C is a diagram illustrating processing by the counter when a continuation time is stopped.

Examples of processing by the counter 13a will be explained here with reference to FIGS. 4A to 4C. FIG. 4A is a diagram illustrating processing by the counter 13a when a determination result of the movement determining unit 12 is constant. FIG. 4B is a diagram illustrating processing by the counter 13a when a determination result of the movement determining unit 12 varies. FIG. 4C is a diagram illustrating processing by the counter 13a when a continuation time is stopped.

First, processing by the counter 13a when the determination result of the movement determining unit 12 is constant will be explained with reference to FIG. 4A. For example, the determination result of the movement determining unit 12, which is input to the counter 13a, is assumed not to change from the time t0 illustrated in FIG. 4A. In this case, the counter 13a sets, at the time t0, the amplification factor of the counter value in accordance with the determination result that is input from the movement determining unit 12, and starts to count the continuation time with the set counter value.

Specifically, when the stopping-state signal is input from the movement determining unit 12 at the time t0, the counter 13a sets the amplification factor corresponding to the stopped state. In this case, for example, the counter value increases along a line A1 illustrated in FIG. 4A. In other words, the slope of the line A1 illustrated in FIG. 4A corresponds to the amplification factor corresponding to the stopped state. The counter 13a starts to count the continuation time from the timing, i.e. the time t0, at which a signal of the stopped state is input.

On the other hand, when the moving-state signal is input from the movement determining unit 12 at the time t0, the counter 13a sets the amplification factor corresponding to the moving state. In this case, for example, the counter value increases along a line A2 illustrated in FIG. 4A. In other words, the slope of the line A2 illustrated in FIG. 4A corresponds to the amplification factor corresponding to the moving state. The counter 13a starts to count the continuation time from the timing, i.e. the time t0, at which the moving-state signal is input.

The counter value of the stopped state reaches a counter threshold value Th at the time ta. On the other hand, the counter value of the moving state reaches the counter threshold value Th at the time tb. As described above, the counter value corresponds to the touch temperature of the present touch position. Therefore, the counter threshold value Th is here upper limit of the touch temperature (for example, 40 degrees).

When the counter value becomes the counter threshold value Th or more, the element controller 13 reduces or stops the vibration of the vibration element 30 by the control to be mentioned later. By making the amplification factor of the counter value differ in accordance with the moving state and the stopped state, the threshold time until the counter value reaches the counter threshold value Th in the moving state can be made longer than that in the stopped state. In other words, the threshold time differs in accordance with the determination result of the movement determining unit 12. From this, because the vibration of the vibration element 30 can be reduced or stopped when the continuation time becomes the threshold time, which is corresponding to the determination result of the movement determining unit 12, or more, the input apparatus 1 can control the temperature of the operation surface P appropriately.

For example, when the stopping-state signal and the moving-state signal are input alternately from the movement determining unit 12, the counter 13a may also set the aforementioned amplification factor of the counter value in accordance with shift of the signals.

Next, processing of the counter 13a in such a case that the determination result of the movement determining unit 12 is changed will be explained with reference to FIG. 4B. It is assumed that the stopping-state signal is input to the counter 13a from the movement determining unit 12 in the time t0 to tc and the time td to te, and the moving-state signal is input to the counter 13a from the movement determining unit 12 in the time tc to td illustrated in FIG. 4B.

When the stopping-state signal is input at the time t0, the counter 13a sets the amplification factor of the counter value corresponding to the stopped state to increase the counter value along the line A1 from the time t0. When the moving-state signal is input from the movement determining unit 12 at the time tc, the counter 13a sets the amplification factor of the counter value corresponding to the moving state from that corresponding to the stopped state.

The counter 13a increases the counter value along the line A2 from a counter value Ba when the count is terminated in the stopped state at the time tc. When the stopping-state signal is input again from the movement determining unit 12 at the time td, the counter 13a sets the amplification factor of the counter value corresponding to the moving state from that corresponding to the stopped state.

After the time td, the counter 13a increases the counter value along the line A1 from the counter value Bb when the count is terminated in the moving state. Because the counter value of the counter 13a becomes the counter threshold value Th or more at the time te, the element controller 13 reduces or stops the vibration of the vibration element 30 by the control to be mentioned later.

In this case, the element controller 13 decides the threshold time with the weight that differs in such a case that the touch is in the stopped state and in the moving state. From this, because the touch temperature of the operation surface P does not increase to exceed a predetermined temperature, the input apparatus 1 can appropriately control the touch temperature.

The user temporarily separates the finger from the operation surface P, or the vibration of the vibration element 30 is turned OFF, and thus the touch temperature of the touch position sometimes decreases temporarily. In this case, the counter 13a, for example, reduces the counter value with the amplification factor corresponding to the lowering rate of the touch temperature per unit time instead of increasing the counter value. The amplification factor corresponding to the lowering rate of the touch temperature is previously memorized in the parameter information 22. Processing by the counter 13a when the continuation time is stopped will be here explained with reference to FIG. 4C.

For example, when the stopping-state signal is input from the movement determining unit 12 in the time t0 to tf illustrated in FIG. 4C, the counter 13a sets the amplification factor of the counter value corresponding to the stopped state to increase the counter value along the line A1 from the time t0. Subsequently, in the time tf to tg, any one of the stopping-state signal and the moving-state signal is not input to the counter 13a from the movement determining unit 12.

In this case, the finger of the user is separated from the operation surface P, or the vibration of the vibration element 30 is turned OFF. Therefore, the counter 13a invokes, at the time tf, the amplification factor corresponding to the lowering rate of the touch temperature from the parameter information 22 to set the counter value to the invoked amplification factor. After the time tf, the counter 13a reduces the counter value from the counter value Bd along the line A3.

For example, when the stopping-state signal is again input to the counter 13a from the movement determining unit 12 at the time tg, the amplification factor of the counter value corresponding to the stopped state is set, and the counter value is increased from the counter value Bc along the line A1 after the time tg.

Because the counter value reaches the counter threshold value Th at the time ti, the element controller 13 can reduce or stop the vibration of the vibration element 30 by the control to be mentioned later.

For example, when any one of the stopping-state signal and the moving-state signal is not input to the counter 13a from the movement determining unit 12 after the time tg, as illustrated in FIG. 4C with a dashed line after the time tg, the counter value reduces to the initial value (initial value is here assumed to be "0") at the time th. Therefore, for example, when one of the stopping-state signal and the moving-state signal is input to the counter 13a from the movement determining unit 12, the counter 13a starts to count from the counter value "0" after the time tg.

In this way, when the finger of the user is separated from the operation surface P, or the vibration of the vibration element 30 is turned OFF, the counter 13a counts the counter value while reducing it in accordance with reduction in the touch temperature.

The counter 13a resets the counter value when the reduced counter value returns to the initial value. On the other hand, when one of the stopping-state signal or the moving-state signal is again input before the reduced counter value returns to the initial value, namely when the detector 11 detects the touch in such a state that the operation surface P is vibrated, the counter 13a restarts to count from the reduced counter value.

Therefore, the counter 13a changes the threshold time on the basis of the previous counter value. From this, because the threshold time is appropriately changed, the input apparatus 1 can control the operation surface P to the appropriate temperature.

In FIGS. 4A to 4C, for convenience of explanation, the amplification factors of the counter value are explained to be the lines A1 to A3, they are not limited to the lines A1 to A3. In other words, the amplification factor of the counter value may be a function, a curved line, or combination thereof, whose amplification factor differs in accordance with the continuation time. The amplification factor may be optimized by experiments and the like.

The counter 13a may change the amplification factor of the counter value in accordance with the touch position to the operation surface P. Specifically, for example, the amplification factor of the counter value is set to be higher at the position that is close to the vibration element 30 of the operation surface P compared with the position that is far from it. This is because the temperature of the operation surface P may be high at the position that is close to the vibration element 30 because of heat generation by the vibration of the vibration element 30.

Returning to the explanation of FIG. 2, the time determining unit 13b will be explained. The time determining unit 13b determines whether or not the counter value, which is input from the counter 13a, is more or equal to the counter threshold value Th, and outputs to the vibration controller 13c a signal (hereinafter, may be referred to as "excess signal") that indicates the fact that the counter value is more or equal to the counter threshold value Th.

As described above, because the counter threshold value Th corresponds to a threshold of time, the time determining unit 13b determines whether or not the continuation time is the threshold time or more by determining whether or not the counter value is the counter threshold value Th or more.

The vibration controller 13c controls the vibration of the vibration element 30 on the basis of the instruction signal that indicates ON/OFF of the vibration element 30, the vibration strength, the vibration frequency, etc., which is input from the higher layer (not illustrated). When the excess signal is input from the time determining unit 13b, the vibration controller 13c reduces or stops the vibration of the vibration element 30 regardless of the instruction signal that is input from the higher layer.

When the vibration of the vibration element 30 is reduced or stopped, because the touch temperature declines, the temperature of the operation surface P does not increase to exceed the touch temperature D. From this, the input apparatus 1 can appropriately control the temperature of the operation surface P.

When reducing or stopping the vibration of the vibration element 30, the vibration controller 13c is here assumed to output the control result to the higher layer. When the control result is input, the higher layer notifies, with at least one of a speaker and a display (not illustrated), the user of the fact that the vibration of the vibration element 30 is reduced or stopped with increasing in the touch temperature of the operation surface P. In this way, the user can be easily made to understand why the vibration of the vibration element 30 and the operation surface P is stopped by notifying the user of the fact that the vibration element 30 is stopped.

The storage 20 stores, for example, the aforementioned coordinate information 21, the parameter information 22, and threshold time information 23 as information that is necessary for processing to be executed by the movement determining unit 12 and the element controller 13, and further stores the results of various processes. The storage 20 is, for example, a semiconductor memory element such as a Random Access Memory (RAM), a flash memory, or a storage device such as a hard disk, an optical disc.

Figure 5:
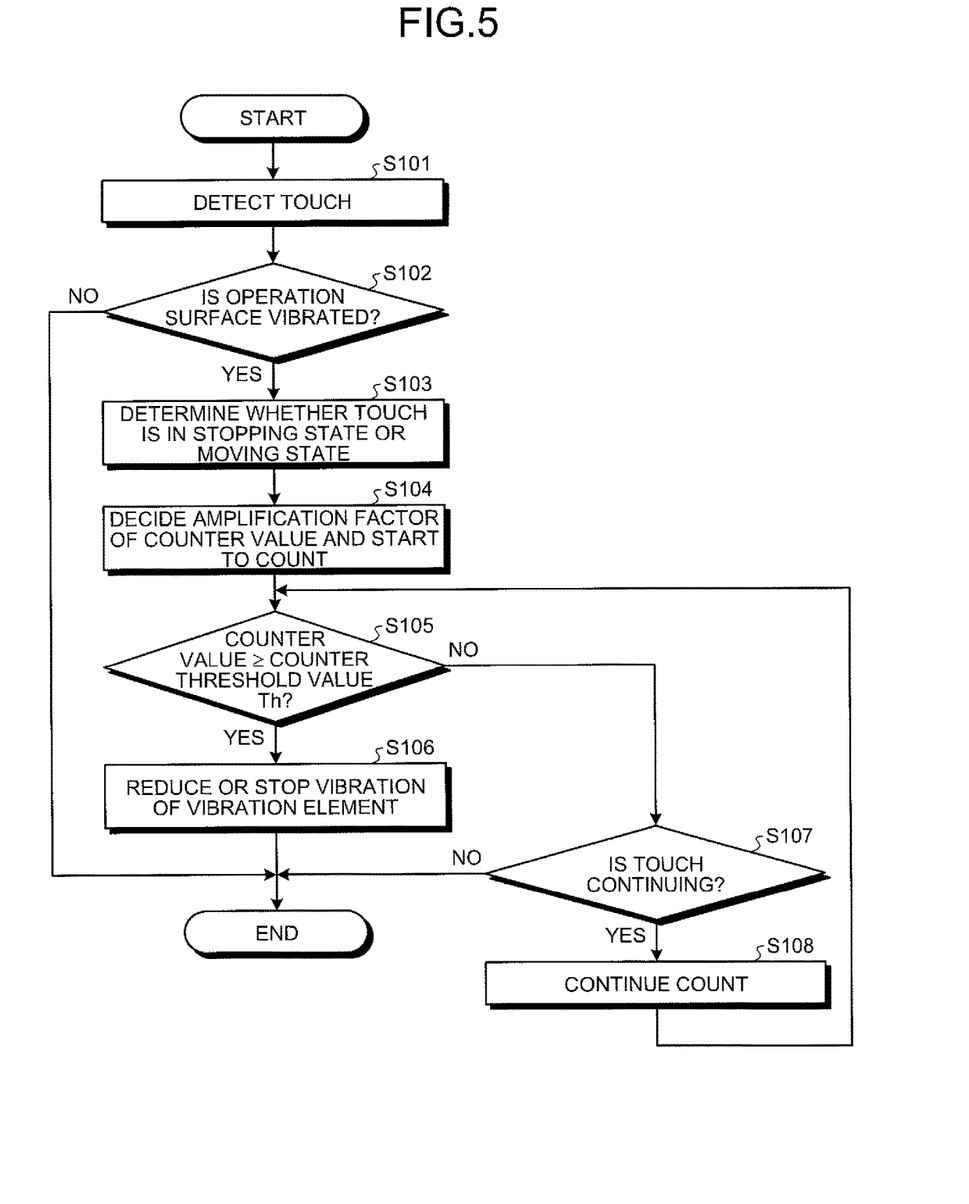
FIG. 5 is a flowchart illustrating a processing procedure of the input apparatus according to the embodiment.

Next, a processing procedure executed by the input apparatus 1 according to the present embodiment will be explained with reference to FIG. 5. FIG. 5 is a flowchart illustrating a processing procedure executed by the input apparatus 1 according to the present embodiment, and illustrates processes that are executed repeatedly by the controller 10 of the input apparatus 1 while the operation surface P accepts the touch operation.

As illustrated in FIG. 5, when the detector 11 of the input apparatus 1 detects the touch on the operation surface P (Step S101), the detector 11 determines whether or not the operation surface P is vibrated (Step S102).

In this determination, when the operation surface P does not vibrate (Step S102: No), the processing is terminated because the touch temperature of the touch position on the operation surface P does not increase. On the other hand, when it is determined that the operation surface P is vibrated in the determination of Step S102 (Step S102: Yes), the movement determining unit 12 determines whether the touch is in the stopped state or the moving state on the basis of the touch-position information that is input from the detector 11 (Step S103).

Subsequently, the counter 13a decides the amplification factor of the counter value in accordance with the determination result of the movement determining unit 12, and starts to count (Step S104). The time determining unit 13b acquires the counter value from the counter 13a in a predetermined cycle, and determines whether or not the acquired counter value is the counter threshold value Th or more (Step S105).

In this determination, when the counter value is the counter threshold value Th or more (Step S105: Yes), the time determining unit 13b posits that the continuation time is the threshold time or more to output the excess signal to the vibration controller 13c. When the excess signal is input from the time determining unit 13b, the vibration controller 13c reduces or stops the vibration of the vibration element 30 (Step S106) to terminate the processing.

On the other hand, when the counter value is less than the counter threshold value Th in the determination of Step S105, the controller 10 posits that the continuation time is less than the threshold time t0 determine whether or not the touch is continuing (Step S107). When the touch is not continuing in this determination (Step S107: No), because the touch temperature of the touch position of the operation surface P is normal, the processing is terminated.

On the other hand, when the touch is continuing in the determination of Step S107 (Step S107: Yes), the count by the counter 13a is continued (Step S108), and processes following Step S105 are to be repeated.

Figure 6:
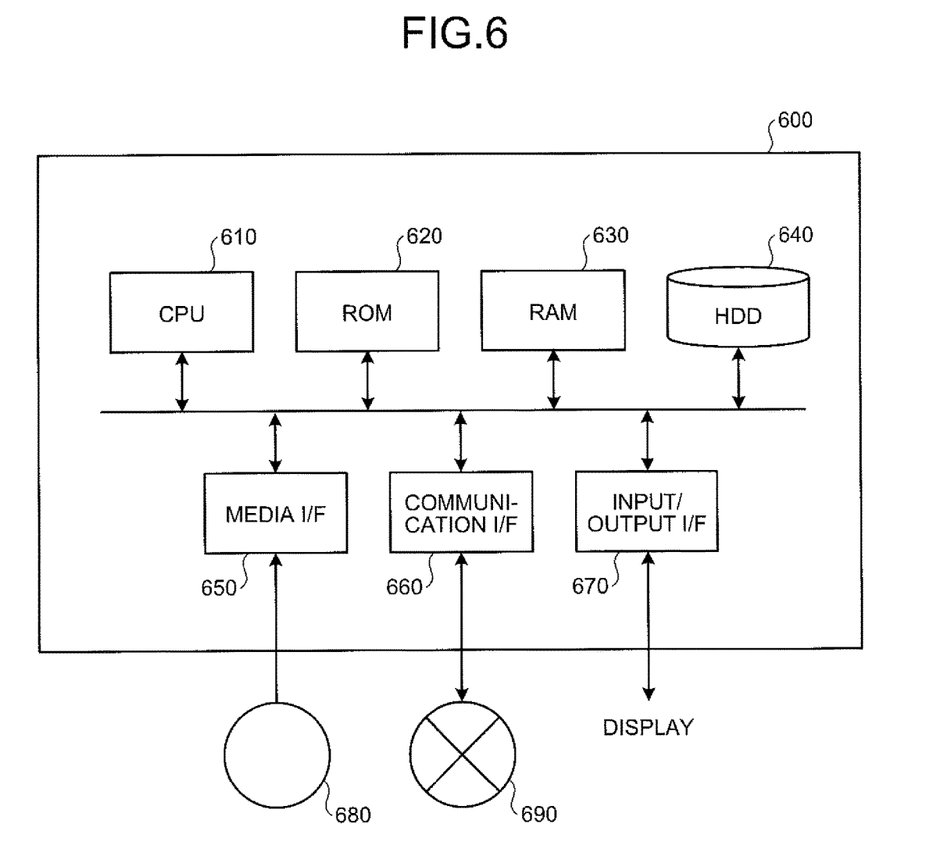
FIG. 6 is a diagram illustrating a hardware configuration example of a computer that realizes functions of the input apparatus according to the embodiment.

The input apparatus 1 according to the present embodiment can be realized by a computer 600 whose configuration is illustrated in FIG. 6 as an example. FIG. 6 is a diagram illustrating a hardware configuration example of a computer that realizes functions of the input apparatus 1.

The computer 600 includes a Central Processing Unit (CPU) 610, a Read Only Memory (ROM) 620, and a Hard Disk Drive (HDD) 640. The computer 600 also includes a media interface (I/F) 650, a communication interface (I/F) 660, and an input/output interface (I/F) 670.

The computer 600 may include a Solid State Drive (SSD), and the SSD may execute a part or all of the function of the HDD 640. Moreover, the SSD may be provided instead of the HDD 640.

The CPU 610 operates on the basis of a program that is stored in at least one of the ROM 620 and the $HDD_{640}$ to control each of the units. The ROM 620 stores a boot program that executed by the CPU 610 on start-up of the computer 600, a program that depends on the hardware of the computer 600, and the like. The HDD 640 stores a program executed by the CPU 610, data used by the program, and the like.

The media I/F 650 loads the program and the data stored in a storage medium 680 to supply them to the CPU 610 via a RAM 630. The CPU 610 loads the loaded program from the storage medium 680 onto the RAM 630 via the media I/F 650 to execute the loaded program. Or, the CPU 610 executes the program by using the data. The storage medium 680 includes, for example, a magneto-optical recording medium such as a Digital Versatile Disc (DVD), a Secure Digital card (SD card), a Universal Serial Bus memory (USB memory), and the like.

The communication I/F 660 receives data from other devices via a network 690 to send the data to the CPU 610, and sends the data generated by the CPU 610 to other devices via the network 690. Or, the communication I/F 660 receives a program from other devices via the network 690 to send the program to the CPU 610, and the CPU 610 executes the program.

The CPU 610 controls, via the input/output I/F 670, a display such as a screen (not illustrated), an output unit such as a speaker, an input unit such as a keyboard, a mouse, or a button, etc. The CPU 610 acquires data from an input unit via the input/output I/F 670. The CPU 610 outputs the generated data to the display, the output unit, etc. via the input/output I/F 670.

For example, when the computer 600 functions as the input apparatus 1, the CPU 610 of the computer 600 executes a program that is loaded on the RAM 630, and thus each of the functions of the detector 11, the movement determining unit 12, and the element controller 13 is realized.

The CPU 610 of the computer 600, for example, loads these programs from the storage medium 680 to execute them. However, as another example, the programs may be acquired from other devices via the network 690. The HDD 640 can also store the information that is stored in the storage 20.

As described above, the input apparatus 1 according to the present embodiment includes the detector 11, the vibration element 30, and the element controller 13. The detector 11 detects a touch on the operation surface P. The vibration element 30 vibrates the operation surface P. The element controller 13 reduces or stops on the basis of a continuation time of the touch that is detected by the detector 11 in such a state that the operation surface P is vibrated.

Therefore, by employing the input apparatus 1 according to the present embodiment, the temperature of the operation surface P can be appropriately controlled.

In the aforementioned embodiment, the case, in which the counter 13a sets the amplification factor of the counter value in accordance with the determination result of the movement determining unit 12, is exemplified, however, is not limited thereto. In other words, the counter 13a may set the amplification factor of the counter 13a in accordance with information on the vibration strength and the ambient temperature of the vibration element 30, which is input from a higher layer (not illustrated). The initial value of the counter value can also be set similarly.

Specifically, for example, when the vibration strength of the vibration element 30 is large, the amplification factor of the counter 13a is set to be higher compared with the case in which the vibration strength is small. This is because the vibration energy of the operation surface P more increases as the vibration strength is larger, and thus the heat that is converted between the finger of the user and the operation surface P by the increased energy becomes larger.

In this way, because the counter 13a sets the amplification factor in accordance with the vibration strength of the vibration element 30, the time (i.e. threshold time) to reach the counter threshold value Th can be adjusted in accordance with the amplification factor. Therefore, the input apparatus 1 can control the operation surface P to the appropriate temperature in accordance with the vibration strength of the vibration element 30.

The counter 13a can also change the time (i.e. threshold time) to reach the counter threshold value Th by changing the initial value of the counter value in accordance with the ambient temperature. Specifically, for example, when the ambient temperature is high, the counter value is changed into the higher initial value compared with the case in which the ambient temperature is low.

When the initial value of the counter value is high, the difference between the initial value and the counter threshold value Th is small. Therefore, the time for the counter value to reach the counter threshold value Th from the initial value becomes short. On the other hand, when the ambient temperature is low, the counter value is changed into the lower initial value compared with the case in which the ambient temperature is high. When the initial value of the counter value is low, difference between the initial value and the counter threshold value Th is large. Therefore, the time for the counter value to reach the counter threshold value Th from the initial value becomes long.

In this way, the counter 13a can adjust the threshold time in accordance with the ambient temperature by changing the initial value of the counter value in accordance with the ambient temperature. From this, the input apparatus 1 can control the operation surface P to the appropriate temperature in accordance with the ambient temperature. The counter 13a may change the counter threshold value Th in accordance with the ambient temperature.

For example, the counter 13a may acquire information on a vibration frequency of the vibration element 30 from a higher layer (not illustrated) or the vibration controller 13c to set the amplification factor of the counter value in accordance with the vibration frequency.

Moreover, the counter 13a may set the amplification factor of the counter value in accordance with at least one of the vibration strength, the vibration frequency, and the ambient temperature of the vibration element 30. In this case, the threshold time is to be changed in accordance with at least one of the vibration strength, the vibration frequency, and the ambient temperature of the vibration element 30. Therefore, the input apparatus 1 can control the operation surface P to the appropriate temperature in accordance with at least one of the vibration strength, the vibration frequency, and the ambient temperature of the vibration element 30.

The counter 13a may adjust the amplification factor of the counter value in accordance with the touch area on the operation surface P. In this case, the detector 11 is assumed to detect the area of the touch. For example, when the user touches the vibrating operation surface P with a stylus pen, the vibration of the operation surface P is hardly converted to heat between the stylus pen and the operation surface P. Therefore, the temperature of the operation surface P does not increase. This is because the touch area of the stylus pen is smaller than that of the finger of the user, and the vibration of the stylus pen is more difficult to be changed into heat than that of the finger of the user is.

The detector 11 is here assumed to detect the area of the touch. The element controller 13 acquires information on the area of the touch from the detector 11 to compare the area of the touch with a predetermined value previously stored in the storage 20. When the area of the touch is the predetermined value or less as a result of the comparison, the counter 13a, for example, may set the amplification factor of the counter value to "0" or an extremely small value. Or, the counter threshold value Th may be set to a larger value. Or, the count by the counter 13a may not be executed. Therefore, the threshold time for the counter value to reach the counter threshold value Th can be unset, or the extremely long threshold time can be set.

From this, because the threshold time when the user operates the operation surface P with other than the finger can be set longer, the user can perform the touch operation for the vibrating operation surface P for a long time. Moreover, the counter 13a may set the amplification factor in accordance with a size of the area of the touch. In this case, for example, when it is a predetermined value or more, the counter 13a sets the amplification factor higher as the area of the touch is larger. This is because the area in which the vibration of the operation surface P is converted to heat is larger as the area of the touch is larger, and thus the total amount of heat that is converted in accordance with the area also becomes larger. Therefore, the counter 13a adjusts the amplification factor in accordance with the touch area, and thus can appropriately control the temperature of the operation surface P.

In the aforementioned embodiment, the case in which the counter 13a adjusts the amplification factor to count it in accordance with the determination result of the movement determining unit 12, and thus the threshold time is set is exemplified, however, is not limited thereto. In other words, the counter 13a may not weight the continuation time, the time determining unit 13b may weight the threshold time in accordance with the determination result of the movement determining unit 12 instead, and thus the threshold time may be changed. Moreover, the threshold time may be changed by combination of them.

Moreover, the aforementioned input apparatus 1 may employ either of a configuration in which a higher layer is included or a higher layer is not included. When the input apparatus 1 employs a configuration in which the higher layer is included, it is constituted of, for example, a smartphone or a tablet. When the input apparatus 1 employs a configuration in which the higher layer is not included, it is constituted of a touch pad, etc.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An input apparatus comprising:
a vibrator that includes a piezoelectric element, the piezoelectric element vibrating an operation surface;
a storage that stores therein, as parameter information, information on amplification factors of counter values per unit time, each of the amplification factors corresponding to a corresponding rising rate of a touch temperature to a continuation time of a touch on the operation surface; and
a processor operatively connected to the storage, the processor programmed to:
detect a touch on the operation surface;
determine whether the touch is in a moving state or a stopped state;
cause the vibrator to vibrate the operation surface;
set, based on the parameter information corresponding to a determined one of the moving state and the stopped state, an amplification factor of a counter value, the amplification factor of the moving state being smaller than the amplification factor of the stopped state;
increase the counter value by using the set amplification factor of the counter value during the touch; and
when the increased counter value reaches a predetermined threshold, reduce or stop, during the touch and regardless of a type of an input operation to the input apparatus specified by the touch, a vibration of the vibrator.

2. The input apparatus according to claim 1, wherein the processor is further programmed to:
decide the amplification factor by using different weights in cases where the touch is in the stopped state and the moving state.

3. The input apparatus according to claim 1, wherein the processor is further programmed to:
change the predetermined threshold based on a continuation time of a detected previous touch detected in the state where the operation surface is being vibrated and a time in a state where the operation surface is not being vibrated.

4. The input apparatus according to claim 1, wherein the processor is further programmed to:
control the vibrator so that a standing wave is generated on the operation surface, and
determine that the touch is in the moving state in a case where the touch moves a half wavelength or more of the standing wave.

5. The input apparatus according to claim 1, wherein the processor is further programmed to:
reduce or stop the vibration of the vibrator based on the amplification factor that corresponds to at least one of a vibration strength, a vibration frequency, and an ambient temperature of the vibrator.

6. The input apparatus according to claim 1, wherein the processor is further programmed to:
detect an area of the touch, and
reduce or stop the vibration of the vibrator based on the amplification factor, the amplification factor being based on the area of the detected touch.

7. A control method of an input apparatus, the method comprising:
detecting a touch on an operation surface;
determining whether the touch is in a moving state or a stopped state;
causing a vibrator to vibrate the operation surface, the vibrator including a piezoelectric element, the piezoelectric element vibrating the operation surface;
setting, based on parameter information corresponding to a determined one of the moving state or the stopped state, an amplification factor of a counter value, the amplification factor of the moving state being smaller than the amplification factor of the stopped state, the parameter information being information on amplification factors of counter values per unit time, and each of the amplification factors corresponding to a corresponding rising rate of a touch temperature to a continuation time of a touch on the operation surface;
increasing the counter value by using the set amplification factor of the counter value during the touch; and
when the increased counter value reaches a predetermined threshold, reduce or stop, during the touch and regardless of a type of an input operation to the input apparatus specified by the touch, a vibration of the vibrator.

* * * * *